Figure 1:
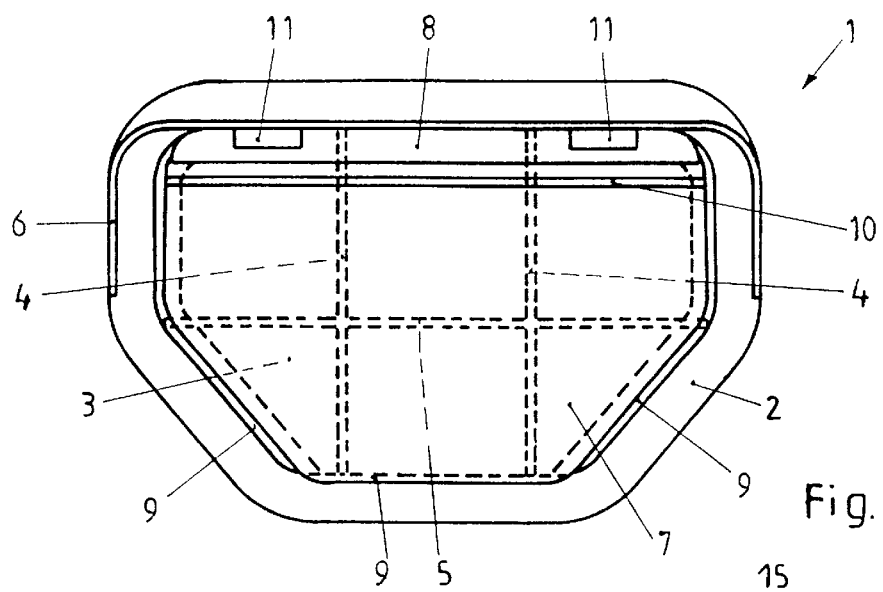

United States Patent
Dietz et al.

[19]

[11] Patent Number: 6,132,308
[45] Date of Patent: Oct. 17, 2000

[54] FORCED VENTILATION SYSTEM FOR MOTOR VEHICLES

[75] Inventors: Michael Dietz, Schwalmstadt; Thorsten Hildebrand, Gudensberg; Joachim Heidel, Kassel, all of Germany

[73] Assignee: Wegu-und Kunststoffwerke GmbH & Co. KG, Kassel, Germany

[21] Appl. No.: 09/214,957

[22] PCT Filed: Jul. 14, 1997

[86] PCT No.: PCT/EP97/03760

§ 371 Date: Jan. 15, 1999

§ 102(e) Date: Jan. 15, 1999

[87] PCT Pub. No.: WO98/03363

PCT Pub. Date: Jan. 29, 1998

[30] Foreign Application Priority Data

Jul. 19, 1996 [DE] Germany .................... 196 29 115

[51] Int. Cl.[7] .................................................. B60H 1/24
[52] U.S. Cl. .................................................. 454/162
[58] Field of Search ............................... 454/162, 164, 454/165; 137/511

[56] References Cited

U.S. PATENT DOCUMENTS

| | | | |
|---|---|---|---|
| 4,920,865 | 5/1990 | Pasquali et al. | 454/162 |
| 4,972,765 | 11/1990 | Dixon | 454/162 |
| 5,105,849 | 4/1992 | Clough | 137/512.15 |
| 5,194,038 | 3/1993 | Klomhaus et al. | 454/162 |
| 5,263,895 | 11/1993 | Kraus et al. | 454/162 |
| 5,355,910 | 10/1994 | Gies et al. | 137/858 |
| 5,503,178 | 4/1996 | Miskelley et al. | 137/67 |

FOREIGN PATENT DOCUMENTS

| | | |
|---|---|---|
| 0 337 071 | 10/1989 | European Pat. Off. . |
| 0 467 095 | 1/1992 | European Pat. Off. . |
| 0 728 606 | 8/1996 | European Pat. Off. . |
| 2905617A1 | 8/1980 | Germany . |
| 4023190C2 | 1/1992 | Germany . |
| 43 22 213 | 9/1994 | Germany . |
| 44 34 136 | 3/1996 | Germany . |
| 19517157C1 | 11/1996 | Germany . |

*Primary Examiner*—Harold Joyce
*Assistant Examiner*—Derek S. Boles
*Attorney, Agent, or Firm*—Womble Carlyle Sandridge & Rice, PLLC

[57] ABSTRACT

A method is disclosed for making a forced ventilation apparatus (1) for equalizing a pressure difference between a passenger compartment and surroundings of a motor vehicle. The apparatus (1) includes a frame (2) made of hard plastics and delimiting an aperture (3), and a flat ventilation flap (7) made of an elastomer material and secured to the frame (2). A resilient restoring force counteracts opening movement of the ventilation flap (7) from a closed position in which the ventilation flap (7) rests on the frame (2) and closes the aperture (3) in the frame. The method comprises the step of injection-molding the ventilation flap (7) to the frame (2) in an opened position. To this end, the elastomer material is pressed from a free end of the ventilation flap (7) into a common contact area (8) of the ventilation flap (7) with the frame (2).

14 Claims, 2 Drawing Sheets

FORCED VENTILATION SYSTEM FOR MOTOR VEHICLES

The invention concerns a forced ventilation system for equalizing the pressure between the passenger compartment and surroundings of a motor vehicle, the system including a frame made of hard plastics and delimiting an aperture, and a flat ventilation flap made of an elastomer material and secured to the frame, a resilient restoring force counteracting opening movement of the ventilation flap from a closed position in which the ventilation flap rests on the frame and closes the aperture in the frame. In the motor vehicle the frame is arranged in an opening of the body of the vehicle, a loop-shaped sealing lip generally caring for a sealed connection of the frame to the body of the vehicle.

The function of such a forced ventilation system is to avoid the build up of pressure in the passengers compartment of the motor vehicle. Such a pressure build up can be caused by the ventilation of the moving motor vehicle, a running ventilator in a standing motor vehicle, the doors of the motor vehicle being slammed shut, and also by the air bag of the motor vehicle being blown up. In any of these cases, a forced ventilation system cares for an equalization of pressure between the passengers compartment and the surroundings of the motor vehicle, so that by the ventilation or the running ventilator, respectively, fresh air can at all be brought into the motor vehicle, a closing of the door is not hindered by the counter pressure in the motor vehicle, and no health injuring pressure peaks occur with the airbag being blown up explosively.

A known forced ventilation system of the kind stated at the beginning has three parts which are at first produced separately and than put together before their common installation at the motor vehicle takes place. Here, there are the frame made of hard plastics, the ventilation flap made of elastomer material and a sealing made of a foam material. Securing the ventilation flap and the sealing to the frame is laboriously and error-drawn as precisely defined conditions have to be kept to the end that the ventilation flap is biased into its closed position closing the aperture in the frame by a small but defined restoring force. This restoring force is important for that no exhaust gases or undesired cold air gets through the forced ventilation system into the passengers compartment of the motor vehicle. This is particularly important when the motor vehicle is standing when no ventilation of the passengers compartment occurs by the driving motion. At the same time the restoring force must not be too strong to not hinder the desired equalization of pressure between the passengers compartment and the surroundings of the motor vehicle.

In another known forced ventilation system according to the type described at the beginning, a loop-shaped sealing lip made of an elastomer material is injection-moulded to the frame at its side opposite to the ventilation flap. This avoids the mounting labour for the sealing. However, the more difficult mounting of the ventilation flap must still be carried out in a separate step after its production.

The invention is based on the task to disclose a forced ventilation system according to the type described at the beginning, which can with particularly low efforts be produced ready for being built in the motor vehicle.

According to the invention this task is solved, in that the ventilation flap is injection-moulded to the frame. That the thus resulting simple and production-advantageous formation of the forced ventilation system is possible at all, is surprising to those skilled in the art, as the ventilation flap in its closed position rests on the frame and therefore can not be injection moulded to the frame in the closed position. On the other hand, injection-moulding of the ventilation flap to the frame in an opened position leads to difficulties with regard to the desired resilient restoring force, which is provided for biasing the ventilation flap into its closed position, as normally an elastic restoring force would have to be overcome to bring the ventilation flap injection-moulded in an opened position to the frame into its closed position. This resilient restoring force would act exactly in the opposites direction as it is actually desired. In the following, however, a way will be described in which an ventilation flap injection-moulded to the frame can be obtained, in which the resilient restoring force counter acts the opening of the ventilation flap out of its closed position. A resilient restoring force is always to be understood as a spring force based on the elastomer material from which the ventilation flap is made itself. This restoring force must not linearly increase with increasing opening; however, as a rule, it shows an increase with increasing opening of the ventilation flap.

Advantageously, the ventilation flap has a groove running parallel to the contact area with the frame, the groove extending over the whole widths of the ventilation flap. This groove defines a folding joint about which the ventilation flap folds open. If pressure differences occur between the passengers compartment and the surroundings of the motor vehicle, the part of the aperture in the frame given free by the flap increases by means of the folding joint much faster than in case of, for example, a flap being made of elastomer material and bends open. In this way, with the new forced ventilation system a faster equalization of pressure is achieved.

Tuned to this opening behaviour the thickness of the ventilation flap is 1.0 to 2.5 mm, i. e. preferably 1.5 to 2 mm. This thickness is sufficient for the ventilation flap not deforming itself in opening, but folds open about the folding axis.

The remaining thickness of the ventilation flap at the base of the groove is preferably 0.3 to 0.8 mm, and is in that way comparatively small, so that deforming the elastomer material at the base of the groove requires much lesser efforts as in the plane of the ventilation flap. By this also, folding the ventilation flap open about the folding axis is enhanced over a deformation of the ventilation flap.

In its preferred embodiment the ventilation flap is in its closed position tilted by 5 to 20° out of a vertical direction, and rests, suspending from the contact area at the frame, on braces, which, as parts of the frame, subdivide the aperture. By tilting the ventilation flap out of the vertical direction, the ventilation flap is biased into the closed position also by the gravity force acting about its folding axis. The rest of the ventilation flap on the braces makes sure that the ventilation flap is not pressed through the aperture in the frame in a direction towards the passengers compartment of the motor vehicle, i. e. against its intended opening direction, in case of air pressure peaks acting from outside. Besides, by the braces it can also made sure that not animals can intrude into the passengers compartment of the motor vehicle via the forced ventilation system even if they can raise the ventilation flap.

Particularly, if the ventilation flap is in its closed position tilted with regard to the vertical direction and needs a correspondingly tilted resting surface, it is useful for production technical reasons that the frame, in an area of at least one clip-in nose serving for securing the frame to the body of the motor vehicle, has an opening which is not covered by the ventilation flap in its closed position. In the new forced ventilation system, it is then provided that this opening is permanently sealed by a hoot made of the elastomer material injection-moulded to the frame in one part with the ventilation flap. Sealing is therefore reliable and possible without additional effort once the mould has been prepared.

If in the new forced ventilation system a sealing lip, which runs loop-shaped around the aperture and which is oriented axially to the aperture, is injection-moulded to the frame at the side opposite to the ventilation flap, it is advantageous that the cross section of the sealing lip decreases in a direction away from the frame but on the side of the sealing lip facing the aperture only. Thus, the cross section of the sealing lip protruding from the frame is at its outside limited by a line running rectangular to the frame, whereas the inner borderline is tilted outwardly. Here, the inner borderline may be curve-shaped, i. e. shaped like a section of a circle-line with an increasing tilt with regard to the frame towards its end. This formation of the sealing lip has the advantage that the sealing lip, in being pressed in its main extension direction onto a surface extending under right angles to the pressing direction, bends to a little defined extend outwardly open, and, by this defined deformation, both causes a reliable sealing and presses the frame with a defined force against resting surfaces, which are typically at clip-in noses of the frame.

A method for producing the new forced ventilation system is according to the invention characterized in that the ventilation flap is injection-moulded to the frame in an opened position, the elastomer material being pressed from the free end of the ventilation flap up into a contact area with the frame. The injection direction for the ventilation flap from its free end is important to obtain a flat ventilation flap.

This is particularly the case, if the elastomer material is pressed underneath and beyond a barrier located in front of the contact area and opposing the frame. This barrier corresponds to the groove in the ventilation flap as made. In pressing the elastomer material underneath and beyond the barrier anisotropic orders are created in the elastomer material, which, despite injection-moulding the ventilation flap in an opened position, cause the resilient restoring force biasing the ventilation flap in its closed position. This restoring force is created with cooling down the elastomer material forming the ventilation flap.

For obtaining the anisotropic orders, which are purposefully used here, to the necessary extend, the cross section of the barrier it advantageously edged and particularly rectangular or trapezoid. Even in case of a rectangular barrier, the cross section of the groove in the ventilation flap resulting from the barrier is trapezoid, if the groove is inspected in a closed position of the ventilation flap, as even a rectangular barrier results in a groove with rectangular cross section only for the opened position in which the ventilation flap is injection-moulded to the frame.

In the preferred embodiment of the new method for producing the forced ventilation system, the frame is injection-moulded in a first caliber of an injection-mould with two calibers. Then, the frame is move into the second caliber, and, then, the ventilation flap is injection-moulded to the frame in the second caliber. In injection-moulding of the ventilation flap, a wedge-shaped separation plate is provided between the frame and the free space for the ventilation flap within the closed injection-mould. The frame is located beneath this separation plate in so far as it is later covered by the ventilation flap. Above the separation plate the ventilation flap comes into existence by pressing-in of elastomer material into the free space. Typically, the wedge-shaped separation plate has an opening angle of 20°. This corresponds to the angle for which the ventilation flap is biased by the purposefully created anisotropic forces in the elastomer material into its closed position after being taken out of the injection mould.

A sealing lip located at the side of the frame opposite to the ventilation flap is, in the new method, injection-moulded to the frame at the same time as the ventilation flap, i. e. preferably in the second caliber of the already mentioned injection-mould.

In the following, the invention is further explained and described be means of an embodiment example. There, FIG. 1 shows the forced ventilation system in a front view, i. e. from outside of the motor vehicle, FIG. 2 is a side view of the forced ventilation system, FIG. 3 is a vertical cross sectional view of the ventilation flap according to FIGS. 1 and 2 and inserted into a vehicle wall, FIG. 4 is a sectional view of a groove in a ventilation flap of the forced ventilation system according to FIGS. 1 to 3, FIG. 5 shows a view corresponding to FIG. 1 on the ventilation flap being illustrated separately, here, FIG. 6 is a sectional view of a detail of the forced ventilation system according to FIGS. 1 to 5, and FIG. 7 shows an injection-mould for injection-moulding the ventilation flap to the frame of the forced ventilation system according to FIGS. 1 to 6.

The forced ventilation system 1 illustrated in FIG. 1 has a frame 2 delimiting an aperture 3. The aperture 3 is subdivided by two vertical braces 4 and one horizontal brace 5. The braces 4 and 5 are with the frame 2 injection-moulded of a hard plastics material. This hard plastics material also forms a ark-shaped and canopy-like protrusion 6. A ventilation flap 7 is provided beneath the protrusion 6 and closes the aperture 3 in its closed position as shown. The ventilation flap 7 is comprised of an elastomer material and is injection-moulded to the frame 2, in that a contact area 8 is formed. The ventilation flap 7 suspends from the contact area 8 and rests on the braces 4 and 5 and on resting surfaces 9 at the frame 2. Beneath the contact area 8 a groove 10 is provided in the ventilation flap 7, which reduces the thickness of the ventilation flap 7 and therefore defines a folding axis for folding-open the ventilation flap out of its closed position as shown in one of several opened positions. Within the contact area 8 the elastomer material injection-moulded to the frame 2 forms two hoots 11, which will be described in more detail together with FIG. 6.

Figure 2:
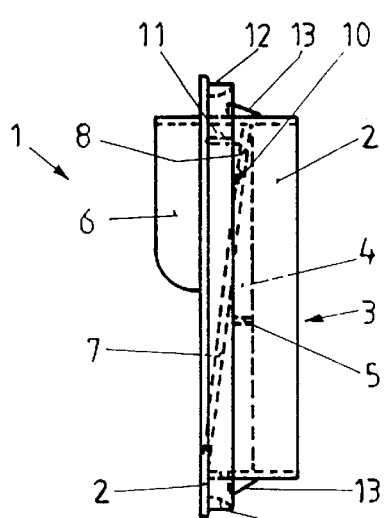
Figure 3:
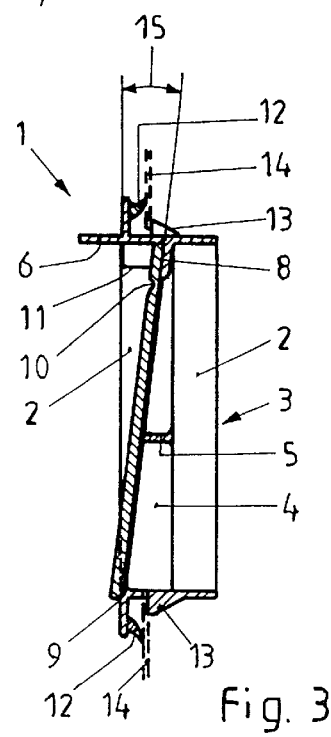

In FIG. 2, the forced ventilation system 1 according to FIG. 1 is shown in a side view. Here, additionally to the details which can already be seen from FIG. 1, the arrangement of a loop-shaped sealing lip 12 at the backside of the frame 2 opposing the ventilation flap 7 can be seen. Further, clip-in noses 13 can be seen, which serve for securing the forced ventilation system 1 in an opening in a body wall which is not depicted in FIG. 2. In this securing, the shape of the cross section of the sealing lip 12 as shown is of particular importance. The cross section of the sealing lip 12 decreases with increasing distance from the frame 2 but only at the inside, whereas the outside is limited by a straight line rectangular to the frame 2. This results in a defined deformation of the sealing lip 12, as can be seen from FIG. 3, which shows an vertical sectional view through the forced ventilation system 1 as built-in into a body wall 14. In building-in the sealing lip 12 deforms by bending outwardly. This bending direction results in a total sealing between the frame 2 and the body wall 14 in case of a pressure-force in a direction, in which the ventilation flap 7 is also kept in its closed position as shown by the pressure difference. In case of a pressure force in opposite direction the sealing between the frame 2 and the body wall 14 does not matter, as the ventilation flap 7 then at once folds open about the folding axis defined by the groove 10 into an opened position. The ventilation flap 7 is biased back into the closed position as shown both by an resilient restoring force by the elastomer material forming the ventilation flap 7 and by its gravity acting about the folding axis. For making use of the gravity, the ventilation flap 7 is, in its closed position, tilted by an tilting angle 15 of 14 out of a vertical direction, the ventilation flap 7 thus resting on the braces 4 and 5 and via the resting surfaces 9 on the frame 2.

Figure 4:
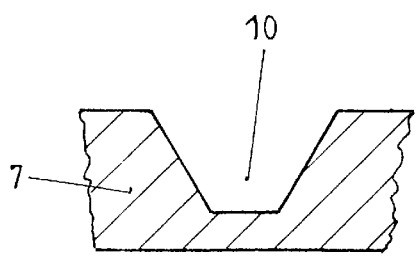

FIG. 4 shows the groove 10 in the ventilation flap 7 in an enlarged sectional view. In reality, the ventilation flap 7 has a thickness of slightly less than 2 mm, and the groove has a depth of about 1.5 mm, so that the remaining thickness of the ventilation flap 7 at the base of the groove is about 0.5 mm. The groove 10 has a trapezoid cross section, when the ventilation flap 7 is in its closed position. In opening the ventilation flap 7, the groove 10 deforms first into a rectangle and than again into a trapezoid, the base of which is however, in contrast to FIG. 4, at the bottom.

Figure 5:
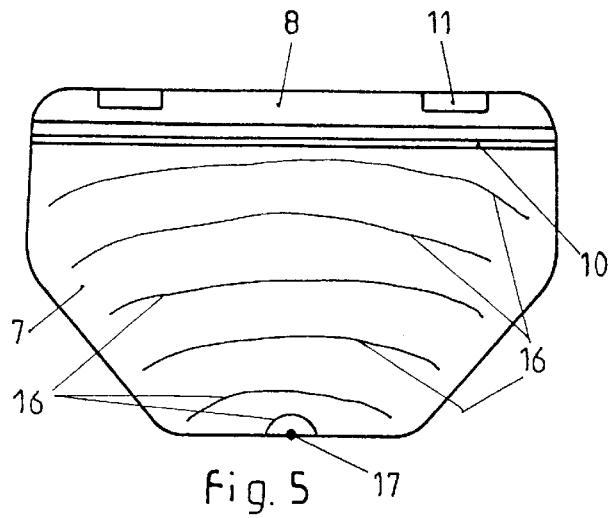
Figure 6:
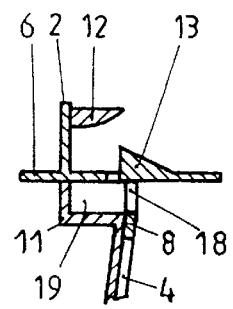

FIG. 5 shows a view at the ventilation flap 7 which is already a part of FIG. 1. In FIG. 5, streaks 16 are additionally illustrated, which are starting wave-like from an injection-point 17 and which are in reality in fact visible as is the injection-point 17 at the elastomer material of the ventilation flap 7. These streaks 16 indicate, that the ventilation flap 7 was injection-moulded starting from the injection-point 17 arranged at the free end of the ventilation flap 7. Doing this, the elastomer material was pressed through the area of groove 10 up into the contact area 8. The injection-moulding of the ventilation flap 7 from its free end is a precondition for the ventilation flap 7 as made has a flat shape to an extend as far as possible.

FIG. 6 illustrates the function of the already mentioned hoots 11 made of the elastomer material. The hoots 11 cover openings 18 in the frame 2 in the area of the upper clip-in noses 13. The openings 18 are necessary for the clip-in noses 13 freely springing-in. In injection-moulding the elastomer material for the hoots 11, a protrusion of the injection-mould fills up the openings 18 and the free space 19 located above the openings 18 to provide resting surfaces for the elastomer material to form the hoots 11.

Figure 7:
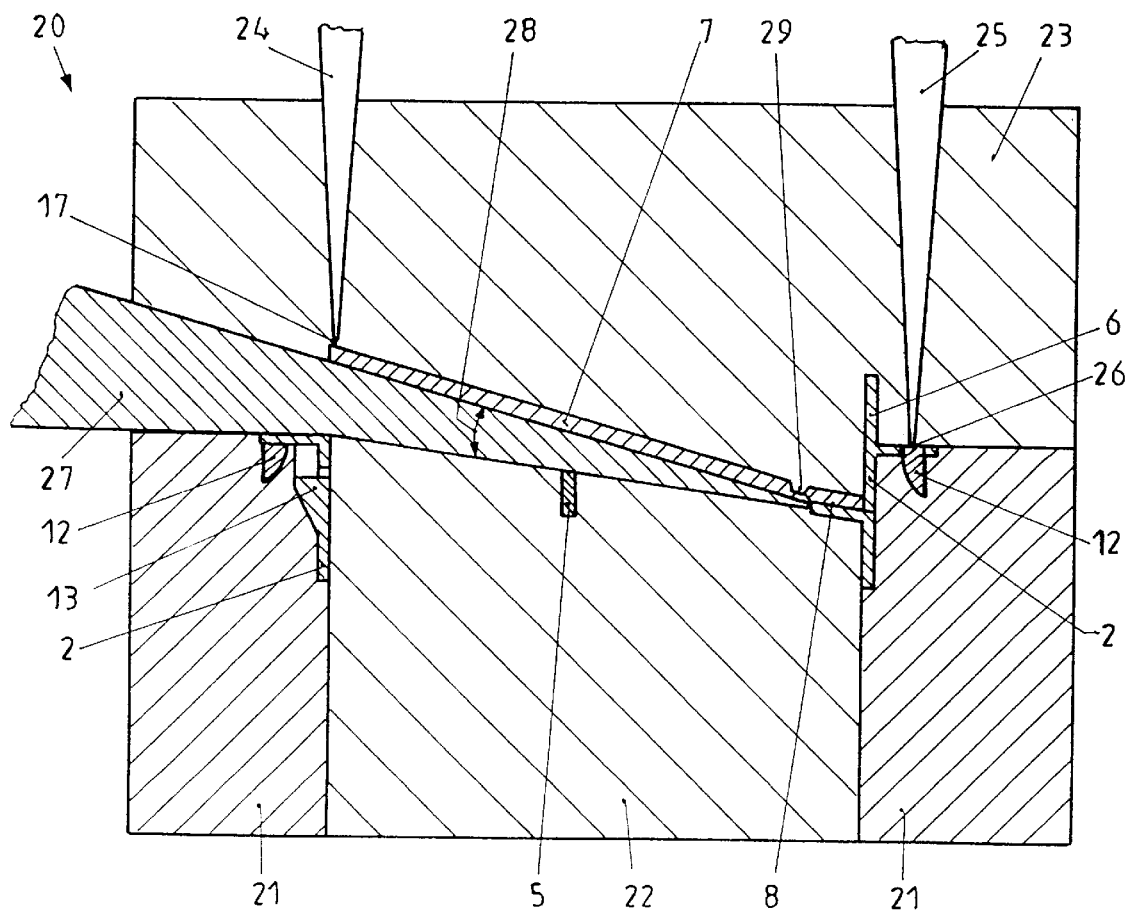

FIG. 7 shows the second caliber of an injection-mould 20. The frame 2 is injection-moulded of hard plastics in the first caliber which is not shown here. In the second caliber of the injection-mould 20 according to FIG. 7, the ventilation flap 7 together with the hoots 11, which are not visible here, and the sealing lip 12 are injection-moulded to the frame 2. The injection mould 2 comprises a lower mould 21, 22 which is two-part to make taking the forced ventilation system out of the injection mould 20 easier by moving the parts 21 and 22 with regard to each other. Two injection channels 24 and 25 are provided in an upper mould 23. The injection channel 24 leads to the injection point 17 according to FIG. 5; the injection channel 25 leads to an injection point 26 for the sealing lip 12. A wedge-shaped separation plate 27 is provided between the lower mould and the upper mould and has an opening angle 28 of about 20°. The separation plate 27 separates the frame 2 outside the contact area 8 from the ventilation flap 7 to hinder an undesired connection of the ventilation flap 7 to the frame 2. During injection-moulding to the frame 2 the ventilation flap 7 is thus in an opened position. However, by the choice of the injection point 17 and a barrier 29 at the upper mould 23 an anisotropic order his purposefully created in the elastomer material injection-moulded for the ventilation flap 7 so that in cooling down of the elastomer material a restoring force comes into existence, which brings the ventilation flap 7 in its closed position even without considering its gravity. The barrier 29 is limited by edges and has a rectangular or trapezoid cross section, the basis of the trapezoid opposing the ventilation flap 7. The groove 10 in the ventilation flap 7 results from the barrier 29. In going underneath and beyond the barrier 29 the flow of the elastomer material is affected by the edges of the barrier 29 so that the restoring force as described occurs after cooling down the elastomer material. The sealing lip 12 is injection moulded through the frame 2 to the end that both injection channels 24 and 25 can be provided in the upper mould.

Usable materials for the hard plastics of the frame are polyethylene or polypropylene. The elastomer material for the ventilation flap 7 is a thermoplastic elastomer material, i. e. a so called TPE (thermoplastic elastomer). Concretely, it can be a EPDM-elastomer or a rubber.

LIST OF REFERENCE SIGNS

1—forced ventilation system
2—frame
3—aperture
4—brace
5—brace
6—protrusion
7—ventilation flap
8—contact area
9—resting surface
10—groove
11—hoot
12—sealing lip
13—clip-in nose
14—body wall
15—tilting angle
16—streak
17—injection point
18—opening
19—free space
20—injection mould
21—part of lower mould
22—part of lower mould
23—upper mould
24—injection channel
25—injection channel
26—injection point
27—separation plate
28—opening angle
29—barrier

What is claimed is:

1. A method for making a forced ventilation apparatus for equalizing a pressure difference between a passenger compartment and surroundings of a motor vehicle, the apparatus including a frame being made of hard plastics and delimiting an aperture, said method comprising the steps of:

injection-molding a ventilation flap of an elastomer material to the frame in an opened position of the ventilation flap, the ventilation flap having a common contact area with the frame and a free end, and the elastomer material being pressed from the free end of the ventilation flap into the common contact area with the frame; and cooling down the elastomer material of the ventilation flap to attain a resilient restoring force counteracting opening movement of the ventilation flap from a closed position in which the ventilation flap rests on the frame and it closes the aperture being arranged in the frame.

2. The method of claim 1, wherein in said step of injection-molding the ventilation flap the elastomer material is pressed underneath and beyond a barrier located in front of the contact area and opposing the frame.

3. The method of claim 2, wherein in said step of injection-molding the ventilation flap the cross section of the barrier is rectangular.

4. The method of claim 2, wherein in said step of injection-molding the ventilation flap the cross section of the barrier is trapezoid.

5. The method of claim 1 and further comprising the steps of:

injection-molding the frame of hard plastics material;

moving the frame into another caliber of an injection-mold; and locating a wedge-shaped separation plate between the frame and a free space for the ventilation flap within the caliber of the injection mold before injection-molding the ventilation flap to the frame in the closed injection-mold.

6. The method of claim 1 and further comprising the steps of:

injection-molding a sealing lip located at a side of the frame opposing the ventilation flap; and injection-molding the sealing lip at the same time as injection-molding the ventilation flap to the frame.

7. A method of making a forced ventilation apparatus for equalizing a pressure difference between a passenger compartment and surroundings of a motor vehicle, the apparatus including a frame being made of hard plastics and delimiting an aperture, said method comprising the steps of:

injection-molding a ventilation flap of an elastomer material to the frame in an opened position of the ventilation flap, the ventilation flap having a common contact area with the frame and a free end, and the elastomer material being pressed from the free end of the ventilation flap underneath and beyond a barrier being located in front of the contact area and opposing the frame into the common contact area with the frame; and cooling down the elastomer material of the ventilation flap to attain a resilient restoring force counteracting opening movement of the ventilation flap from a closed position in which the ventilation flap rests on the frame and it closes the aperture being arranged in the frame.

8. A forced ventilation apparatus for equalizing a pressure difference between a passenger compartment and surroundings of a motor vehicle, said apparatus comprising:

a frame made of hard plastics;

an aperture being arranged in said frame to be delimited by said frame;

vertical braces being arranged in said frame and subdividing the aperture, said braces being injection-molded in one part with said frame of the hard plastics; and a flat ventilation flap being made of an elastomer material and being injection-molded to said frame, a resilient restoring force counteracting opening movement of said ventilation flap from a closed position in which said ventilation flap rests on said frame and it closes said aperture in said frame.

9. The forced ventilation apparatus of claim 8, further comprising a groove being located in said ventilation flap, said groove running parallel to said contact area of said ventilation flap with said frame and extending across said whole ventilation flap.

10. The forced ventilation apparatus of claim 8, wherein said ventilation flap has a thickness of 1.0 to 2.5 mm.

11. The forced ventilation apparatus of claim 8, further comprising a groove being located in said ventilation flap, said groove having a base, running parallel to said contact area of said ventilation flap with said frame, and extending across said whole ventilation flap, wherein said ventilation flap has a thickness of 1.0 to 2.5 mm and wherein said ventilation flap has a remaining thickness at the base of said groove of 0.3 to 0.8 mm.

12. The forced ventilation apparatus of claim 8, wherein said ventilation flap in its closed position is arranged at a tilting angle of 5 to 20 degrees with respect to a vertical direction, and suspending from said contact area at the frame it rests on said braces.

13. The forced ventilation apparatus of claim 8, wherein said frame, in the area of at least one clip-in nose serving for securing said frame to a body of the motor vehicle, has an opening which is not covered by said ventilation flap in its closed position but which is permanently sealed by a hoot being injection-molded to said frame in one part with said ventilation flap.

14. The forced ventilation apparatus of claim 8, further comprising a sealing lip extending loop-shaped around said aperture and being oriented axially to said aperture, said sealing lip being injection-molded to said frame at its side opposite to said ventilation flap, wherein said sealing lip on its side facing said aperture has a cross section decreasing in a direction away from said frame.

* * * * *